(12) United States Patent (10) Patent No.: US 8,496,267 B2
Wohlberg et al. (45) Date of Patent: Jul. 30, 2013

(54) VEHICLE PROTECTION DEVICE

(76) Inventors: Pamela Wohlberg, Budd Lake, NJ (US);
Juan Fernandez, Towaco, NJ (US)

( * ) Notice: Subject to any disclaimer, the term of this patent is extended or adjusted under 35 U.S.C. 154(b) by 32 days.

(21) Appl. No.: 13/316,747

(22) Filed: Dec. 12, 2011

(65) Prior Publication Data

US 2013/0147173 A1 Jun. 13, 2013

(51) Int. Cl.
*B60J 11/00* (2006.01)
(52) U.S. Cl.
CPC ...................................... *B60J 11/00* (2013.01)
USPC .......................................... 280/770; 293/128
(58) Field of Classification Search
USPC ................... 280/770, 848; 293/128, 102, 126
See application file for complete search history.

(56) References Cited

U.S. PATENT DOCUMENTS

| 3,738,695 | A | * | 6/1973 | McBee | 293/128 |
| 4,002,363 | A | * | 1/1977 | James | 293/128 |
| 4,014,583 | A | * | 3/1977 | Forbes | 293/128 |
| 4,561,685 | A | * | 12/1985 | Fischer | 293/128 |
| 4,828,303 | A | * | 5/1989 | Soria | 293/128 |
| 5,799,992 | A | * | 9/1998 | Kojima | 293/128 |
| 6,736,435 | B1 | | 5/2004 | Ditthavong | |
| 6,955,383 | B2 | * | 10/2005 | Cano | 293/128 |
| 7,229,108 | B2 | * | 6/2007 | Hochrein | 293/128 |
| 7,527,320 | B1 | * | 5/2009 | Nevell, Jr. | 293/102 |
| 8,118,338 | B2 | * | 2/2012 | Kimball | 293/128 |
| 2006/0197348 | A1 | | 9/2006 | Hochrein | |
| 2007/0108780 | A1 | * | 5/2007 | Udolph | 293/128 |

FOREIGN PATENT DOCUMENTS

WO WO 03/099612 A2 4/2003

OTHER PUBLICATIONS

PCT/US2012/069150; International Search Report and Written Opinion; Mar. 28, 2013.

* cited by examiner

*Primary Examiner* — Hau Phan
(74) *Attorney, Agent, or Firm* — Gearhart Law, LLC

(57) ABSTRACT

A protection device for the outside of a vehicle is described. An impact absorbing structure is placed on the outside of a vehicle and is anchored to the vehicle using a strap. The strap is secured between the doorframe and the roof of the vehicle and allows the impact absorbing structure to hang horizontally along the outside of the vehicle. Any object that would otherwise impact and damage the vehicle, such as the door of a neighboring car in a parking lot, is intercepted by the protection device.

24 Claims, 6 Drawing Sheets

VEHICLE PROTECTION DEVICE

FIELD OF THE INVENTION

The invention relates to a protection device for vehicles, in particular to a device that protects the doors and outer body of a vehicle from damage such as dents and dings.

BACKGROUND OF THE INVENTION

Automobiles and other vehicles are often damaged in parking lot situations, when the door of one vehicle is opened and comes into contact with the side panel or door panel of an adjacent vehicle. The damage can include scratches, dents, and chipped paint. Such damage will reduce the aesthetic appearance of the automobile and render it more vulnerable to corrosion, reducing its resale value. Damage to the exterior surface is expensive to repair and may even require repainting to fix properly.

The present invention is directed toward protecting a user's vehicle from damage through the use of a removable protection device that acts to absorb the blow from a door of a neighboring vehicle. The device is easy to use, easy to store in a vehicle, and offers better protection than other devices through its unique shape and the depth of the device. Many attempts have been made to provide protection to the door of a vehicle. Examples are described below:

U.S. Pat. No. 3,738,695 teaches a vehicle impact protection device including an outer tube having a predetermined internal diameter and at least one inner tube having an external diameter of less than that of the outer tube. The inner tube or tubes are operative to be moved into and out from their respective outer tubes thereby forming telescopic means. There are at least two suspension means each being attached by an end thereof to the outer tube while an opposite free end thereof serves to secure the entire device to the vehicle.

U.S. Pat. No. 4,014,583 teaches an automobile bump protector having a plurality of force-absorbing body portions with the body portions being flexibly joined together and being foldable relative to each other to form a compact package. The body portions in their unfolded state provide a side area having a length that covers the "bump area" of an automobile side panel and a width which is sufficient to shield the outward extremities of an automobile side panel from impact. The bump protector includes a plurality of hanger straps such that the body portions may be suspended in an unfolded state adjacent to an automobile side panel to shield the side panel from physical contact. Magnetic members are associated with each of the body portions and the magnetic members of adjacent body portions are positioned to provide mutual attraction between adjacent body portions when the body portions are folded together to form a compact package.

U.S. Pat. No. 4,561,685 teaches a flexible belt adapted to be located around the top edge, the outside, the bottom edge and inside of one of the side doors of a motor vehicle such that the door may be closed with the belt secured in place looped around the door. An elongated protective pad is secured to the belt at a position such that it may be located on the outside of the motor vehicle in a generally horizontal position when the belt is secured in place looped around the door.

U.S. Pat. No. 7,229,108 teaches a removable device for protecting parked automobile doors from dents, scuffs and scratches to its surface that may be caused by the doors of adjacent automobiles or other objects. The device consists of protective elements joined by a rope and mounted to the automobile by magnets. The device has a security tether which engages a locked door of an automobile to resist theft of the device.

U.S. Pat. No. 4,707,009 teaches an automobile side protector for guarding both sides of an automobile against dents and scratches from adjacent automobile doors and other sources. The protector has a saddle band of sufficient length to pass over the top of an automobile. A pair of tabs extends inwardly from the saddle band and can be captured by the doors or windows of the automobile to be protected. Support bands extending downwardly from the saddle band hold one or more protective pads which extend along each side of the automobile.

U.S. Pat. No. 7,229,108 teaches a removable device for protecting parked automobile doors from dents, scuffs and scratches to its surface that may be caused by the doors of adjacent automobiles or other objects. The device consists of protective elements joined by a rope and mounted to the automobile by magnets. The device has a security tether which engages a locked door of an automobile to resist theft of the device.

U.S. Pat. No. 7,527,320 teaches a foam guard system that attaches to the side and bumper areas of a parked vehicle to protect it from damage to paint and body. The guard is made of closed cell polyethylene foam supported by a supporting interior core and secured in place by means of sturdy flexible strapping extending over the door, fender, and/or bumper areas.

US Patent Application No. 20070108780 teaches an automatic side door protector comprising a protective pad and a support strap. The support strap is connected to the protective pad at one or more places. The protective pad may be divided into two or more segments which may be folded for compact storage. The automatic side door protector is installed on the vehicle to be protected by pinching the support strap either between a window and the window frame or between the door and the door frame. An enlarged end on the support strap helps to prevent the support strap from being pulled back through the closed window or door. The automatic side door protector is height adjustable by varying the length of the support strap that is pinched off by the window or door.

The present invention is easier to use than many other devices, as it is anchored to the vehicle at a single point using a strap. The strap is secured by passing it over the door frame, then shutting it between the doorframe and the roof of the vehicle. Alternately, the strap may be secured by passing it over a rolled-down window, then rolling up the window to clamp it between the window and the door frame. Other devices use multiple anchoring points, which have to be lined up with each other in order for the protective strip or pad to stay in the desired orientation.

The present invention has an advantage in that it can be deployed either from inside or outside of a vehicle; it can be anchored to the vehicle either between the door frame and the roof, or between the door frame and the window. With the other devices described above, it is assumed that the user places the device on the vehicle while standing outside of the vehicle. The present invention may also be deployed from outside of the vehicle, in which case it would preferably be anchored between the door frame and the roof. In cases of inclement weather, or where the user is waiting in the car for someone, or in any situation in which the user would rather spend as little time outside the vehicle as possible, he may want to deploy the device by rolling down the desired window, passing the device through the opening, and rolling the window back up to anchor the device strap between the doorframe and the window.

The present invention has a unique shape compared to other devices, in that has a flat surface such that it lies flat against the user's vehicle and a rounded surface that is presented to a neighboring vehicle. This adds stability to the position of the device on the vehicle, while yielding a larger protective depth against damage from neighboring vehicles than may be the case for other devices. In both embodiments disclosed herein, the present invention compresses to a compact shape, unlike bulkier pads or bumper strips that have been described above. Thus, the present invention can be more easily stored in a vehicle.

Various implements are known in the art, but fail to address all of the problems solved by the invention described herein. Two embodiments of this invention are illustrated in the accompanying drawings and will be described in more detail herein below.

SUMMARY OF THE INVENTION

In one embodiment the present invention is a vehicle outer-body protection device, comprising: a first arm and a second arm made from impact absorbing structures and having substantially the same size, shape, and structure, and a single strap; an outer tube and at least one inner tube on each of the first arm and second arm, wherein the inner tube is telescopically attached to the outer tube and can be moved into and out from the outer tube; a connecting compartment that is equidistant between the first arm and second arm, and which connects the first arm and second arm, comprising a strap cavity and a strap retraction device; said strap having a first end and a second end, wherein the strap can be retracted to reside in the strap cavity of the connecting compartment and can be extended to an adjusted length, wherein the adjusted length can be controlled by the strap retraction device, the strap being oriented so it is substantially perpendicular to the first arm and second arm when the first arm and second arm are in a sequentially longitudinal alignment; and a blocking element attached to the second end of the strap.

In another embodiment, the invention is a vehicle outer-body protection device, comprising: a first arm and a second arm made from impact absorbing structures and having substantially the same size, shape, and structure; and a single strap a connecting compartment that is equidistant between the first arm and second arm, and which connects the first arm and second arm, comprising a strap cavity, a first hinge and a second hinge, the first hinge connected to the first arm and the second hinge connected to the second arm, wherein rotation of the first and second hinges allow the first and second arm to switch from a sequentially longitudinal alignment to a side-by-side alignment; a strap retraction device; said strap having a first end and a second end, wherein the strap can be retracted to reside in the strap cavity of the connecting compartment and can be extended to an adjusted length, wherein the adjusted length can be controlled by the strap retraction device, the strap being oriented so it is substantially perpendicular to the first arm and second arm when the first arm and second arm are in a sequentially longitudinal alignment; and a blocking element attached to the second end of the strap.

Therefore, the present invention succeeds in conferring the following, and others not mentioned, desirable and useful benefits and objectives.

It is an object of the present invention to provide a device to protect the outer body of a vehicle.

It is an object of the present invention to provide a device to protect a vehicle door.

It is an object of the present invention to provide a device to protect a vehicle door from dings, dents and scratches.

It is an object of the invention to provide a device to protect a vehicle door from damage in a parking lot.

It is an object of the present invention to provide a device to protect a vehicle door from damage caused by doors of other vehicles impacting the user's vehicle door.

It is an object of the present invention to provide a device that is easy to use.

It is an object of the present invention to provide a device that is easy to store.

Still another object of the present invention is to provide a device that is removable.

Still another object of the present invention is to provide a device that is adjustable.

BRIEF DESCRIPTION OF THE DRAWINGS

FIG. 5 is a perspective cut away view of the first embodiment of the invention in an expanded from.

DESCRIPTION OF THE PREFERRED EMBODIMENTS

Figure 1:
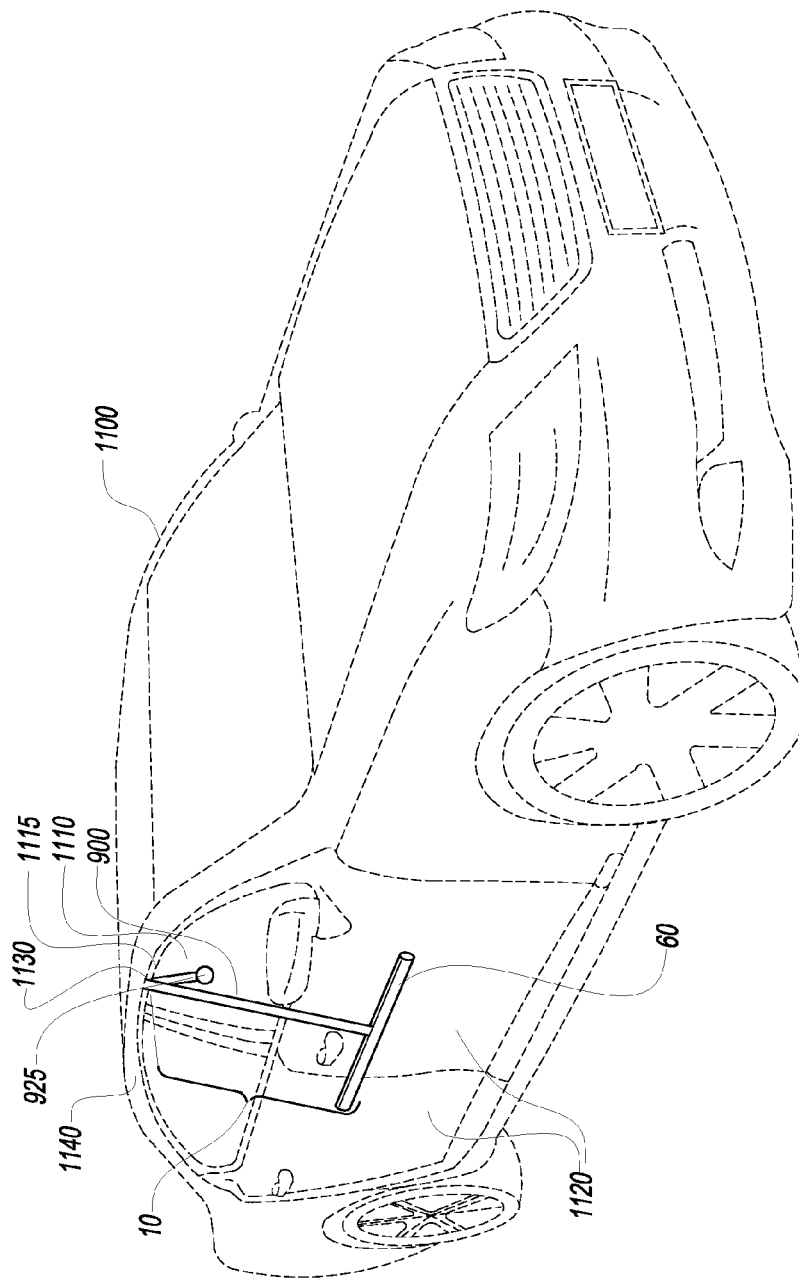
FIG. 1 shows the invention in use on a vehicle.

The preferred embodiments of the present invention will now be described with reference to the drawings. Identical elements in the various figures are identified with the same reference numerals. For reasons of clarity not all parts are labeled on every figure.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows the invention in use on a vehicle. Shown is the device 10, the device impact absorbing structure 60, the strap 900, the strap blocking element 925, the vehicle 1100, the vehicle window 1110, the vehicle window top rim 1115, the vehicle door(s) 1120, the vehicle door frame 1130, and the vehicle roof 1140. The device 10 is anchored onto the vehicle 1100 via the vehicle window 1110 and vehicle door frame 1130, or via the vehicle door frame 1130 and the vehicle roof 1140 using the strap 900. The strap blocking element 925 prevents the strap from slipping out of the space between the window and the door frame (or between the door frame and the roof) and also gives the user a handle to hold onto when adjusting the strap length. The device impact absorbing structure 60 rests against the vehicle doors 1120.

In order to use the invention as shown in FIG. 1, a user opens the desired vehicle door 1120, places the device impact absorbing structure 60 against the door, and passes the strap 900 over the vehicle doorframe 1130. The strap length is adjusted so that the a portion of the strap and the strap blocking element 925 are inside the vehicle and the strap blocking element 925 rests against the inside of the vehicle window 1100, while the device impact absorbing structure 60 is in the desired place on the outside of the vehicle. The user then shuts the vehicle door, and the device is secured on the vehicle by the strap being secured between the vehicle doorframe 1130 and the vehicle roof 1140.

In the case where the device is secured via the vehicle window 1110 and the vehicle door frame 1130, a user opens the desired vehicle door 1120 and/or rolls down the desired vehicle window 1110. The device impact absorbing structure 60 is placed against the outside of the vehicle door 1120 and the strap 900 is adjusted to the desired length by pulling on it (for more detail on the strap adjustment process, see FIG. 5). The strap 900 is placed over the vehicle window top rim 1115 so a portion of the strap and the strap blocking element 925 go into the interior of the vehicle. The vehicle window 1110 is rolled up into the vehicle door frame 1130, thus securing the strap 900 between the vehicle window top rim 1115 and the vehicle doorframe 1130. The device 10 is thus secured onto the vehicle 1100. If the vehicle door 1120 has been opened, it may now be closed.

If the user chooses to remain in the vehicle while deploying the device, the impact absorbing structure 60 may be fully extended when passed through the window, may be partly extended, or may be fully compressed. The user may open the impact absorbing structure to the desired degree once he has passed it through the window.

When deployed as shown in FIG. 1, when a vehicle door is opened next to the user's vehicle, it will impact the device impact absorbing structure 60, instead of impacting the user's vehicle door or other part of the vehicle outer body. If the user is inside his vehicle and opens the vehicle door, the device impact absorbing structure 60 will impact any vehicle within door range of his vehicle, thus protecting a neighboring vehicle. A user may want to install the device 10 on his vehicle before opening the door of his vehicle if it is in a tight parking spot, for instance.

When the user extends both arms of the device impact absorbing structure, the device rests against the vehicle in a horizontal alignment so that it protects a length of the vehicle from damage from another vehicle or object.

Although FIG. 1 depicts the vehicle as a car, the device may be used on any type of vehicle, including but not limited to, a motorcycle, truck, SUV, moped, scooter, or boat. In these cases the device may be anchored in varying ways, such as but not limited to, tying the strap to a part of the vehicle, pinching the strap between two or more parts of the vehicle, etc. Alternately, the strap may have a mechanism that allows it to be oriented in the desired position to anchor the device impact absorbing structure and then to be secured to itself, such as but not limited to, a buckle type of mechanism, a hook and loop fastener, or other securing mechanisms. The mechanism may be integral to the strap or may be retrofitted onto the strap shown in the figures.

The device 10 may also be modified in ways that facilitate use with a certain type of vehicle, in that the shape or dimensions may be altered. For instance, the device overall dimensions and component dimensions may be larger for a boat than for a car, and the flat portion may be slightly curved to follow the curve of the boat. For use with a motorcycle, the device may be modified to follow the curve of the side panel or exhaust pipe, and it may be anchored to the motorcycle by winding the strap around a component of the body and securing it to itself.

The device 10 may also be used as a bumper guard on a vehicle such as a car. In this case, the shape or dimensions of the device may be altered, for instance to make it taller. For example, the dimension labeled device flat surface height 45 shown in FIG. 6 may be greater for a bumper guard; in FIG. 6 the preferred dimension is 7.5 cm for the height, but it may be 10-25 cm for the car bumper guard. The device 10 may also have a slightly different shape, in that it may be tapered at the ends, or may have more or less of a protrusion of the rounded surface. The device impact absorbing structure 60 may be slightly curved to mimic the shape of a car bumper.

Figure 2:
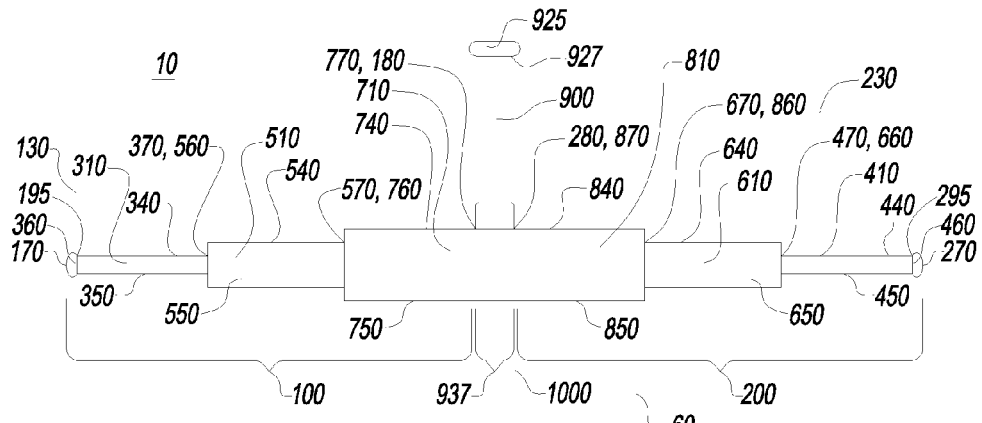
FIG. 2 is a front view of the first embodiment of the invention in an expanded form.

FIG. 2 is a front view of the first embodiment of the invention in an expanded form.

FIG. 2 shows the device 10, with a first arm 100 and a second arm 200.

First arm 100 has first arm front surface 130, first arm distal end 170, first arm proximate end 180, and first arm pull knob 195. First arm 100 also has three tubes which are described below.

First arm first inner tube 310 has first arm first inner tube top surface 340, first arm first inner tube bottom surface 350, first arm first inner tube distal end 360, and first arm first inner tube proximate end 370.

First arm second inner tube 510 has first arm second inner tube top surface 540, first arm second inner tube bottom surface 550, first arm second inner tube distal end 560, and first arm second inner tube proximate end 570.

First arm outer tube 710 has first arm outer tube top surface 740, first arm outer tube bottom surface 750, first arm outer tube distal end 760, and first arm outer tube proximate end 770.

Second arm 200 has second arm front surface 230, second arm distal end 270, second arm proximate end 280, and second arm pull knob 295. Second arm 200 also has three tubes which are described below.

Second arm first inner tube 410 has second arm first inner tube top surface 440, second arm first inner tube bottom surface 450, second arm first inner tube distal end 460, and second arm first inner tube proximate end 470.

Second arm second inner tube 610 has second arm second inner tube top surface 640, second arm second inner tube bottom surface 650, second arm second inner tube distal end 660, second arm second inner tube proximate end 670.

Second arm outer tube 810 has second arm outer tube top surface 840, second arm outer tube bottom surface 850, second arm outer tube distal end 860, and second arm outer tube proximate end 870.

The device 10 also has a strap 900, strap blocking element 925, strap blocking element interface 927, and a strap cavity (not shown) with strap cavity length 937 and a connecting compartment 1000.

Figure 3:
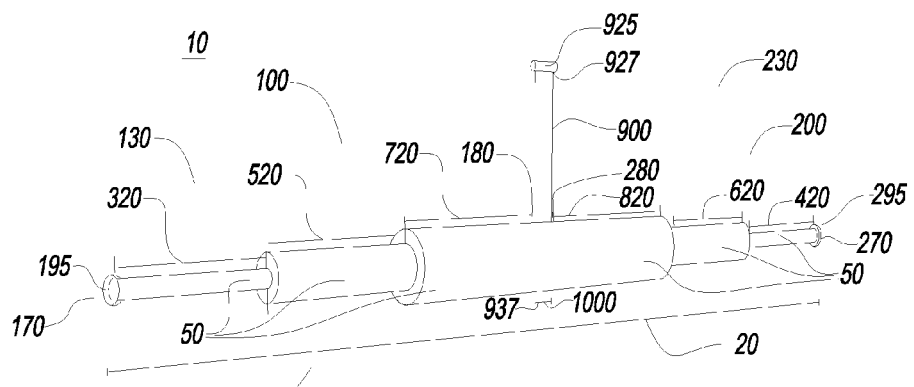
FIG. 3 is a front perspective view of the first embodiment of the invention in an expanded form.

FIG. 3 is a front perspective view of the first embodiment of the invention in an expanded form. Shown in FIG. 3 is the device 10, device extended length 20, device rounded surface 50, and device impact absorbing structure 60.

Figure three also shows first arm 100, first arm front surface 130, first arm distal end 170, first arm proximate end 180, first arm pull knob 195, first arm first inner tube length 320, first arm second inner tube length 520, and first arm outer tube length 720.

Also depicted are second arm 200, second arm front surface 230, second arm distal end 270, second arm proximate end 280, second arm pull knob 295, second arm first inner tube length 420, second arm second inner tube length 620, and second arm outer tube length 820.

The strap 900, strap blocking element 925, strap blocking element interface 927, strap cavity length 937 and connecting compartment 1000 can also be seen in FIG. 3.

As can be seen in FIGS. 2 and 3, this embodiment has a first arm and a second arm with a connecting compartment between them. Both arms have tubes that telescope so that the device can be extended or compressed. In a preferred embodiment, the first arm and the second arm have approximately the same dimensions. When the device is extended as shown, the device extended length 20 is between 10 cm and 5 m, with a preferred device extended length of approximately 100 cm, with a first arm preferred length of approximately 47 cm, a second arm preferred length of approximately 47 cm, and a preferable strap cavity length 937 of approximately 6 cm. The first arm first inner tube and second arm first inner tube are approximately equal in length, with a first arm first inner tube length 320 and a second arm first inner tube length 420 being 3 cm to 2.5 m long, with a preferred length of approximately 17 cm for each first inner tube including the length of the pull knob. The first arm second inner tube and second arm second inner tube are approximately equal in length, with a first arm second inner tube length 520 and a second arm second inner tube length 620 being 3 cm to 2.5 m long, with a preferred length of approximately 15 cm for each second inner tube. The first arm outer tube and second arm outer tube are approximately equal in length, with a first arm outer tube length 720 and a second arm outer tube length 820 being 3 cm to 2.5 m long, with a preferred length of approximately 15 cm for each outer tube. The strap cavity length 937 is 1 cm to 40 cm, with a preferred length of approximately 6 cm.

The first arm inner tube and the second arm inner tube are capped with the first arm pull knob 195 and the second arm pull knob 295, respectively. This gives the user knobs to pull when extending the first and second arms. The knobs are preferably shaped similarly to the arms, although they may be any shape, and are sized such that they provide a surface to grasp and pull. The knobs may be the same material as the arms or a differing material, and may be removable or permanently affixed. The knobs may also be pushed on when compressing the arms.

The rounded surface protrudes approximately 1 to 200 cm from the flat surface, with a preferred dimension of 4 to 6 cm from the flat surface for an automobile or other type of consumer vehicle, and, if desired, a larger dimension for a larger type of vehicle, such as a commercial vehicle or large truck.

The first arm first inner tube 310 and second arm first inner tube 410 are preferably solid, but may be hollow. The first arm second inner tube 510 and second arm second inner tube 610, and the first arm outer tube 710 and second arm outer tube 810 are all hollow in this embodiment so that the corresponding tubes may be telescoped into them. The materials of manufacture of the tubes may be the same for all of the tubes or may be different for differing tubes. The materials of manufacture for the tubes of the arms include, but are not limited to, rubbers, plastics, graphene, thermoplastics, thermoplastic elastomers, wood types, paper, fiberglass or other glass products, metals, fabrics, textiles, animal or plant components, or any combination of these materials with each other or with other materials. A preferred material for the tubes of the arms is foam, and preferably open cell high density foam.

The materials of manufacture for the strap 900 and strap blocking element 925 include, but are not limited to, fabrics, including but not limited to metal-reinforced fabric, textiles, rubbers, plastics, graphene, thermoplastics, thermoplastic elastomers, wood types, paper, fiberglass or other glass products, metals, animal or plant components, or any combination of these materials with each other or with other materials. A preferred material for the strap is a single cord or flat strap made of nylon. A preferred material for the strap blocking element is plastic, metal or rubber.

Figure 4:
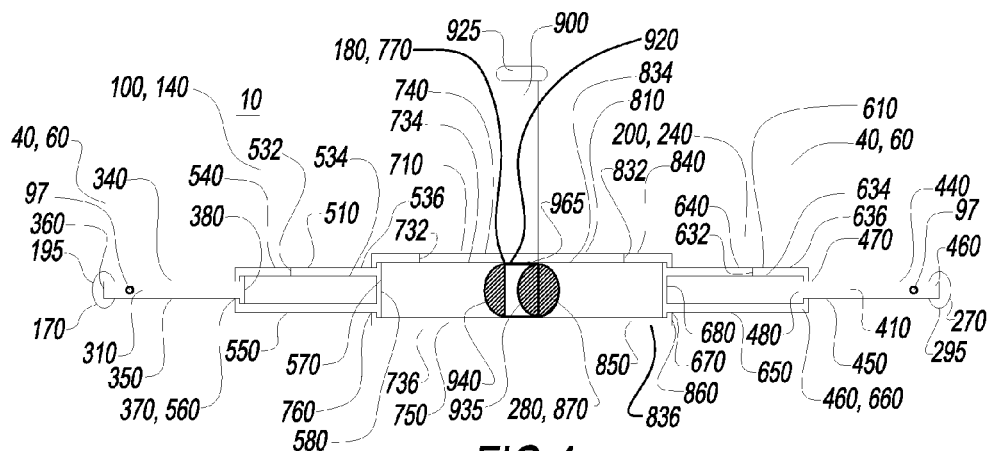
FIG. 4 is a back cut-away view of the first embodiment of the invention in an expanded form.

FIG. 4 is a back view of the first embodiment of the invention in an expanded form.

FIG. 4 shows the device 10, device flat surface 40, and device impact absorbing structure 60 with magnets 97 on either distal end of the first and second arms.

Also shown are first arm 100, first arm back surface 140, first arm distal end 170, and first arm proximate end 180 and first arm pull knob 195. As in FIG. 2, the three tubes are depicted also.

First arm first inner tube 310 has first arm first inner tube top surface 340, first arm first inner tube bottom surface 350, first arm first inner tube distal end 360, first arm first inner tube proximate end 370, and first arm first inner tube stop 380.

First arm second inner tube 510 has first arm second inner tube wall thickness 532, first arm second inner tube inner surface 534, first arm second inner tube outer surface 536, first arm second inner tube top surface 540, first arm second inner tube bottom surface 550, first arm second inner tube distal end 560, first arm second inner tube proximate end 570, and first arm second inner tube stop 580.

First arm outer tube 710 has first arm outer tube wall thickness 732, first arm outer tube inner surface 734, first arm outer tube outer surface 736, first arm outer tube top surface 740, first arm outer tube bottom surface 750, first arm outer tube distal end 760, first arm outer tube proximate end 770.

FIG. 4 also shows second arm 200, second arm back surface 240, second arm distal end 270, and second arm proximate end 280 and second arm pull knob 295. As in FIG. 2, the three tubes are depicted also.

Second arm first inner tube 410 has second arm first inner tube top surface 440, second arm first inner tube bottom surface 450, second arm first inner tube distal end 460, second arm first inner tube proximate end 470, and second arm first inner tube stop 480.

Second arm second inner tube 610 has second arm second inner tube wall thickness 632, second arm second inner tube inner surface 634, second arm second inner tube outer surface 636, second arm second inner tube top surface 640, second arm second inner tube bottom surface 650, second arm second inner tube distal end 660, second arm second inner tube proximate end 670, and second arm second inner tube stop 680.

Second arm outer tube 810 has second arm outer tube wall thickness 832, second arm outer tube inner surface 834, second arm outer tube outer surface 836, second arm outer tube top surface 840, second arm outer tube bottom surface 850, second arm outer tube distal end 860, and second arm outer tube proximate end 870.

FIG. 4 also shows strap 900, strap blocking element 925, strap cavity 935, strap cavity first wall 940, and strap cavity second wall 965.

FIG. 4 more clearly shows the tube stops. First arm first inner tube stop 380 has a circumference that is larger than the circumference of the first arm first inner tube 310, and is approximately equal to the inner circumference of the first arm second inner tube 510. The first arm first inner tube stop 380 is disposed at the first arm first inner tube proximate end 370, and stays inside the first arm second inner tube at all times, at the first arm second inner tube distal end 560.

The circumference of the opening of the first arm second inner tube is approximately equal to but is slightly larger than the circumference of the first arm first inner tube 310, while, as stated above, the circumference of the first arm first inner tube stop 380 is approximately equal to the first arm second inner tube inner circumference, which is larger than the first arm first inner tube circumference. Thus, when the first arm first inner tube 310 is pulled by the user to telescopically expand the device, the tube is prevented from being pulled completely out of the device by the first arm first inner tube top 380, because it contacts the inner walls of the first arm second inner tube 510.

The description above equally applies to first arm first arm first inner stop 580 with its corresponding components, second arm first inner tube stop 480 with its corresponding components, and second arm second inner tube stop 680 with its corresponding components.

The volumes of the tubes are such that they fit inside each other flush or nearly flush. The first arm first inner tube 310 and second arm first inner tube 410 are approximately the equal, as are the volumes of the first arm second inner tube 510 and the second arm second inner tube 610, and the first arm outer tube 710 and second arm outer tube 810. The volume of the first arm second inner tube 510 is such that the first arm first inner tube 310 can fit inside it, and therefore can be telescoped into it. The volume of the first arm outer tube 710 is such that the first arm second inner tube 510 can fit inside it, and can therefore be telescoped into it. The same is true for the tubes of the second arm 200.

The wall thicknesses of the first arm first inner tube, first arm outer tube, second arm first inner tube, and second arm outer tube are all approximately equal, and are approximately 0.1 cm to 10 cm thick, with a preferred thickness of approximately 1 cm. This is thick enough to give the tubes the strength to withstand impacts from objects, without making the device overly bulky.

In a preferred embodiment the shapes of the tubes are identical, although they could differ from one another. For example, the first inner tube could be completely round and the second inner tube could be constructed with a rounded surface and a flat surface, with a large enough volume to accommodate the first inner tube.

Both the first arm and second arm are shown with magnets disposed on their respective distal ends. The magnets may aid in securing the impact absorbing device to the vehicle.

FIG. 4 also shows the strap cavity 935, which will be discussed in more detail with FIG. 5.

Figure 5:
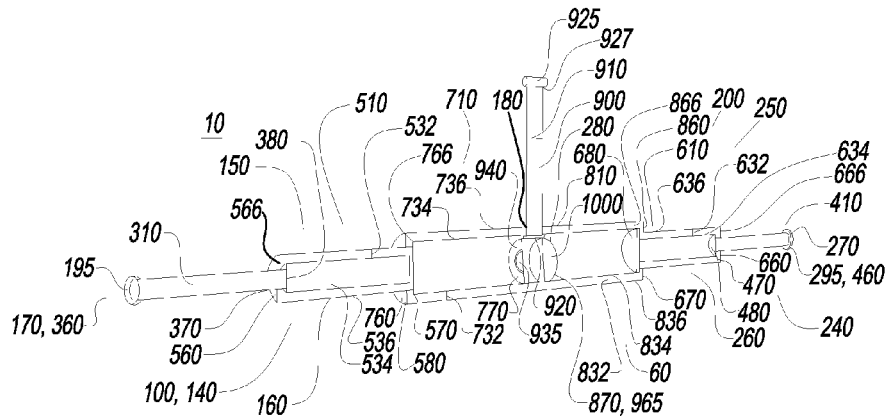

FIG. 5 is a cut away view of the first embodiment of the invention in an expanded from.

FIG. 5 shows the device 10 with device impact absorbing structure 60 and strap 900.

The device impact absorbing structure 60 has a first arm 100, and a second arm 200.

First arm 100 has first arm back surface 140, first arm top surface 150, first arm bottom surface 160, first arm distal end 170, first arm proximate end 180, and first arm pull knob 195. The first arm has three tubes.

First arm first inner tube 310 has first arm first inner tube distal end 360, first arm first inner tube proximate end 370, and first arm first inner tube stop 380.

First arm second inner tube 510 has first arm second inner tube wall thickness 532, first arm second inner tube inner surface 534, first arm second inner tube outer surface 536, first arm second inner tube distal end 560, first arm second inner tube distal end lip 566, first arm second inner tube proximate end 570 and first arm second inner tube stop 580.

First arm outer tube 710 has first arm outer tube wall thickness 732, first arm outer tube inner surface 734, first arm outer tube outer surface 736, first arm outer tube distal end 760, first arm outer tube distal end lip 766, and first arm outer tube proximate end 770.

Second arm 200 has second arm back surface 240, second arm top surface 250, second arm bottom surface 260, second arm distal end 270, second arm proximate end 280, and second arm pull knob 295. The second arm also has three tubes.

Second arm first inner tube 410 has second arm first inner tube distal end 460, second arm first inner tube proximate end 470, and second arm first inner tube stop 480.

Second arm second inner tube 610, has second arm second inner tube wall thickness 632, second arm second inner tube inner surface 634, second arm second inner tube outer surface 636, second arm second inner tube distal end 660, second arm second inner tube distal end lip 666, second arm second inner tube proximate end 670, and second arm second inner tube stop 680.

Second arm outer tube 810 has second arm outer tube wall thickness 832, second arm outer tube inner surface 834, second arm outer tube outer surface 836, second arm outer tube distal end 860, second arm outer tube distal end lip 866, and second arm outer tube proximate end 870.

The device 10 also has strap 900, strap width 910, strap interface 920, strap blocking element 925, strap blocking element interface 927, strap cavity 935, strap cavity first wall 940, strap cavity second wall 965, and connecting compartment 1000.

In FIG. 5, the shape of the second arm second inner tube stop 680 is more clearly shown than in the other figures. The shapes of the other tube stops are the same. The second arm second inner tube stop 680 has a rounded surface and a flat surface; this also is the shape of the tubes that comprise the first arm and the second arm.

The second arm outer tube distal end lip 866 is formed so that it overlaps part of the second arm second inner tube stop 680. Thus, when the second arm second inner tube is pulled on by the user in order to pull it out of the second arm outer tube and expand the device, the outward motion is stopped by the second inner tube stop 680 contacting the overhanging second arm outer tube distal end lip 866. This is true for all of the tubes and tube stops in the device.

Also more clearly shown in FIG. 5 is the strap cavity 935 and the strap 900 components. The strap cavity is in the connecting compartment 1000, which connects the first arm 100 and the second arm 200. The first arm 100 ends at the strap cavity first wall 940, and the second arm 200 ends at the strap cavity second wall 965.

The strap 900 has a width that is either approximately equal to or is smaller than the width of the strap cavity 935. The strap 900 is stored in the strap cavity 935 when the strap is not in use. If the entire strap is not used when the device is disposed on a vehicle, then the unused portion of the strap is stored in the strap cavity 935. The length of the strap can be 10 cm to 5 m, with a preferred length of 1.5 m.

The strap 900 is joined to the device impact absorbing structure through use of the strap interface 920. The strap interface 920 is an opening in the top of the strap cavity that allows the strap to pass from the inside of the strap cavity to the outside of the strap cavity. The strap interface may include a tension assembly to provide a tension to hold the strap in place when the strap is extended. Alternately or in addition to the strap interface 920, the strap retractor (not shown) may provide the tension necessary to hold the strap at a desired length.

A strap retractor (not shown) in the strap cavity provides a tension such that the strap is retracted when not locked in place. The strap retractor may have set stations that engage when the strap is pulled to certain lengths and are released when further pulled on by the user. The stations would act to lock the strap in place at a certain extended length. There may be any number of stations. The strap blocking element 925 prevents the strap from retracting fully into the strap cavity. The strap retractor could be manually wound, with or without a locking mechanism, or could have a button to push to retract the strap.

When the user desires to adjust the length of the strap, he grasps the strap blocking element 925 and pulls on it, jerking it when a desired length is reached. The strap retractor locks the strap into place in the nearest station. When the user wishes to retract the strap, he pulls on the strap and lets go quickly so that it retracts into the strap cavity 935.

The strap blocking element 925 may be attached to the strap at the strap blocking element interface 927 by any method, including but not limited to, gluing, lacing, hook and eye closure, melting one piece into the other, welding, riveting, or any method that achieves the desired result.

Figure 6:
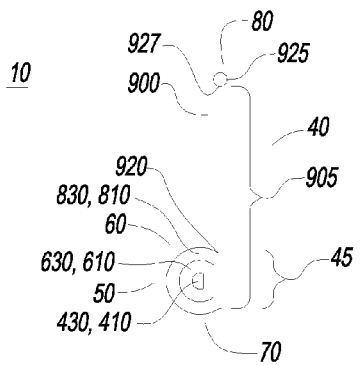
FIG. 6 is a side cut-away view of the first embodiment of the invention.

FIG. 6 is a side cut-away view of the first embodiment of the invention.

FIG. 6 shows the device 10, device flat surface 40, device flat surface height 45, device rounded surface 50, device impact absorbing structure 60, device bottom 70, device top 80, second arm first inner tube 410, second arm first inner tube outer circumference 430, second arm second inner tube 610, second arm second inner tube outer circumference 630, second arm outer tube 810, second arm outer tube outer circumference 830, strap 900, strap length 905, strap interface 920, strap blocking element 925, and strap blocking element interface 927.

FIG. 6 illustrates the shape of the device 10. The impact absorbing structure 60 has a device flat surface 40 and a device rounded surface 50. The circumferences of the tubes include the rounded and flat portions, such that the circumference is measured starting from and ending at the same point. For instance, the second arm outer tube circumference would be measured starting at the point labeled 920 on the figure, with the measurement conducted in a clockwise direction down the flat part of the outer tube, then around the rounded part of the outer tube to end again at the point labeled 920. The relations of the tube circumferences to each other were discussed with FIG. 4.

As illustrated in FIG. 5, for each of the tubes, the inner circumference is smaller than the outer circumference by an amount equal to the tube wall thickness.

The device flat surface 40 rests against the vehicle, helping to give the device stability and keep it in place on the vehicle. The device flat surface height is preferably 1 cm to 50 cm, with a preferred height of 7.5 cm. The device rounded surface 50 allows a point of contact with another vehicle door or other object so that the user's vehicle is protected from dents and dings.

Although the flat surface is illustrated as being straight and completely flat, it may be essentially but not completely flat. It may have features including but not limited to, contours, bumps, ridges, levels, etc. The term 'flat' indicates that this surface is flat when compared to the rounded surface.

Figure 11:
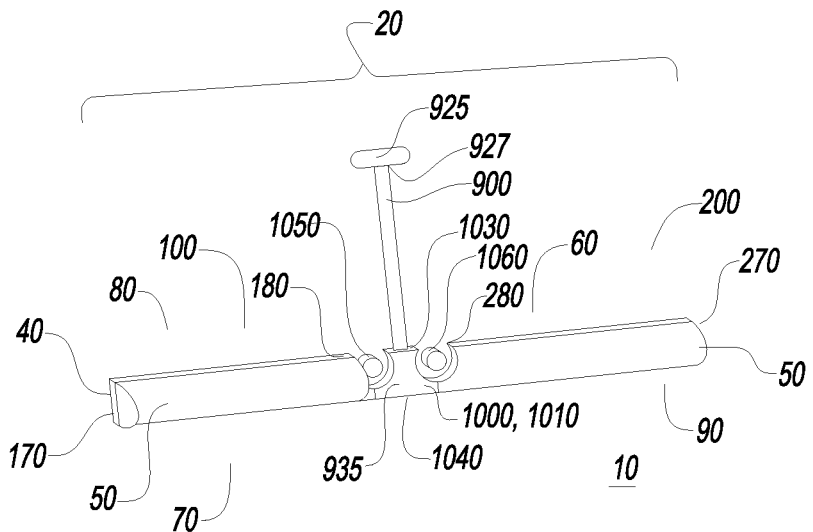
FIG. 11 is a front perspective view of the second embodiment of the invention in an expanded form.

The rounded surface is illustrated as a nearly complete circle; it may be circular, or any shape that allows the rounded surface to present a rounded portion on the side that is farthest from the user's vehicle. Another example of the rounded surface is shown in FIG. 11.

Although FIG. 6 shows only the second arm, the first arm contains all of the same features.

The strap 900 has a length 905 that can be adjusted so that the impact absorbing structure 60 is resting on the desired part of the vehicle when a portion of the strap 900 is inside the vehicle, as discussed with FIG. 1. The strap length is preferably 50 to 1000 cm long, with a preferred length for use on an automobile or other consumer vehicle approximately 107 to 137 cm long.

Figure 7:
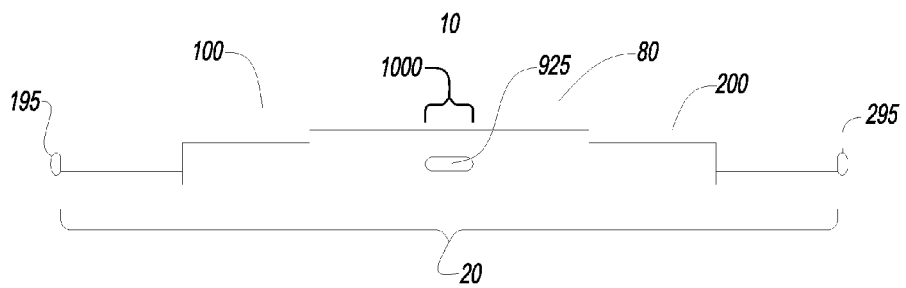
FIG. 7 is a top view of the first embodiment of the invention in an expanded form.

FIG. 7 is a top view of the first embodiment of the invention in an expanded form.

FIG. 7 shows the device 10, device extended length 20, device top 80, first arm 100, and first arm pull knob 195, second arm 200, second arm pull knob 295, strap blocking element 925, and connecting compartment 1000. As can be seen in FIG. 7, the preferred embodiment of the device is for the first arm 100 and the second arm 200 to be approximately equal, with the connecting compartment 1000 joining them.

The blocking element may be made of a lightweight material such as but not limited to a plastic, or may be weighted, for instance by making it out of a dense substance. The blocking element may be any shape, including but not limited to, cylindrical, cubical, pyramidal, spherical, or other shape. The preferred shape is cylindrical. The blocking element may be any size, with dimensions being a length of 1 cm to 20 cm, with a preferred length of 5-7 cm, and a diameter of 1 cm to 10 cm, with a preferred diameter of 2 cm. It may protrude from the center of the strap cavity as shown, or it may protrude from the front, back, or any portion of the strap cavity.

Figure 8:
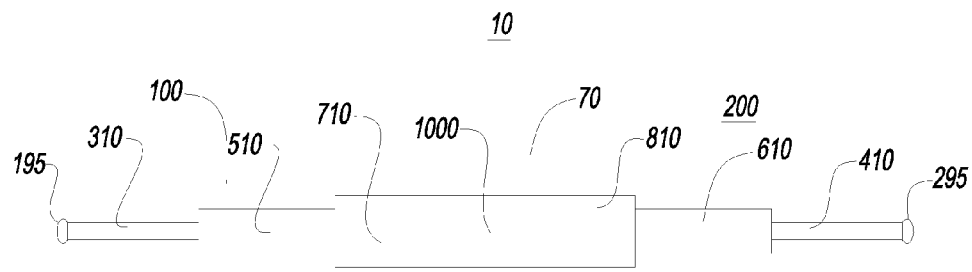
FIG. 8 is a bottom view of the first embodiment of the invention in an expanded form.

FIG. 8 is a bottom view of the first embodiment of the invention in an expanded form.

FIG. 8 shows the device 10, device bottom 70, first arm 100, first arm pull knob 195, second arm 200, second arm pull knob 295, first arm first inner tube 310, first arm second inner tube 510, first arm outer tube 710, second arm first inner tube 410, second arm second inner tube 610, second arm outer tube 810, and connecting compartment 1000.

As can be seen in FIG. 8, in this embodiment of the device 10, the first arm outer tube, second arm outer tube, and connecting compartment 1000 comprise one continuous piece. As discussed previously, the first arm first inner tube is slidably attached to the first arm second inner tube via the first arm first inner tube stop, and the first arm second inner tube is slidably attached to the first arm outer tube 710 via the first arm second inner tube stop 580. The same is true of the tubes on the second arm. The strap is contained in the connecting compartment. Thus, the device is one piece, which enables the user to store it and use it without losing any parts.

Although all of the previous figures have shown the preferred device configuration when in use with the device fully extended, one arm of the device could be extended while the other remains compressed. This may be desirable if the user wishes to have the device impact absorbing structure in a vertical or partly vertical position rather than a horizontal position in relation to the vehicle.

The device may be used as shown in the previous figures, with the first arm first inner tube, 310 first arm second inner tube 510, second arm first inner tube 410 and the second arm second inner tube 610 all completely extended. Alternately, any or all of the inner tubes may be partially extended. Additionally, any or all of the inner tubes may be extended while the other inner tubes remain compressed, for instance, the first arm first inner tube 310 may be extended while the other tubes remain compressed. Another configuration may be with the first arm first inner tube 310 and the first arm second inner tube 510 extended while the tubes of the second arm remain compressed. These configurations may be desirable, for instance, on a motorcycle where the user wants a diagonal or vertical alignment of the device with the vehicle in order to protect the side of the motorcycle.

The figures have all shown the first arm and the second arm with three tubes each, the first inner tube, the second inner tube, and the outer tube. The device as shown has a total of six tubes. The device may have any number of tubes, from one tube to 20 tubes, with the preferred number being six tubes.

In the case where the device has one tube, the strap 900 would be attached at the center of the one tube. In the case where the device had 20 tubes, there would preferably be 10 tubes comprising the first arm and 10 tubes comprising the second arm, such that the first arm and second arm are symmetrical. Although having the first arm and the second arm be symmetrical is preferred for this embodiment, the first arm and second arm do not have to be symmetrical. For instance, the first arm could have two tubes and the second arm could have 5 tubes; the overall length of each arm could be the same or different, and the lengths of the tubes could be the same or different compared to each other or different. The volumes of the corresponding tubes in the two arms could be the same or different. One arm could have telescoping tubes while the other arm is fixed in length.

Figure 9:
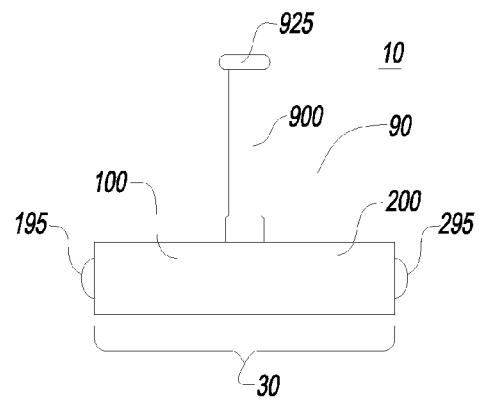
FIG. 9 is a front view of the first embodiment of the invention in a compressed form.
Figure 10:
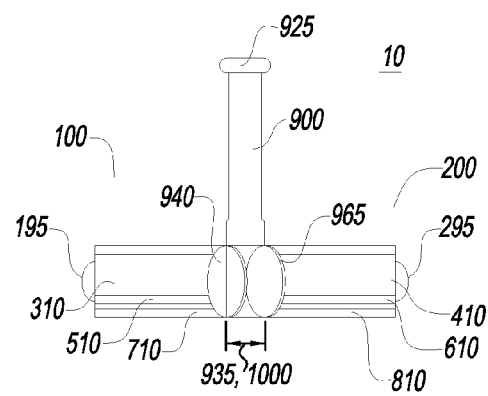
FIG. 10 is a back cut-away view of the first embodiment of the invention in a compressed form.

FIGS. 9 and 10 show the device 10 in a compressed form.

FIG. 9 is a front view of the first embodiment of the invention in a compressed form.

FIG. 9 shows the device 10, device compressed length 30, device front 90, first arm 100, first arm pull knob 195, second arm 200, second arm pull knob 295, strap 900, and strap blocking element 925.

FIG. 10 is a back cut-away view of the first embodiment of the invention in a compressed form.

FIG. 10 shows the device 10, first arm 100, first arm pull knob 195, first arm first inner tube 310, first arm second inner tube 510, first arm outer tube 710, second arm 200, second arm pull knob 295, second arm first inner tube 410, second arm second inner tube 610, second arm outer tube 810, strap 900, strap blocking element 925, strap cavity 935, strap cavity first wall 940, strap cavity second wall 965, and connecting compartment 1000.

As can be seen in FIGS. 9 and 10, the device impact absorbing structure 60 can be compressed so that the resulting length of the device is approximately one third of the length of the device in the extended form. Thus, device compressed length 30 is approximately 40 cm in a preferred embodiment. This enables a user to easily store the device when not in use.

FIG. 10 illustrates how the first arm first inner tube 310 is compressed into the first arm second inner tube 510, which is compressed into the first arm outer tube 710. The same is true for the second arm; the second arm first inner tube 410 is compressed into the second arm second inner tube 610, which is compressed into the second arm outer tube 810. The tubes are compressed into each other by manually pushing on the first inner tube until it telescopes into the second inner tube, then manually pushing on the second inner tube until it and the first inner tube together telescope into the outer tube.

When the user is pushing on the first arm first inner tube 310 to compress it into the device, the tube is stopped by the first arm first inner tube stop 380 impacting the first arm second inner tube stop 580. The first arm second inner tube 510 is stopped by the strap cavity first wall 940. The same is true for the corresponding components of the second arm. This yields a final length for the compressed device that is approximately equal to the length of the outer tubes plus the strap cavity length and the lengths of the pull knobs. Although the preferred embodiment is to have manual operation, this could also be controlled through non-manual methods, such as but not limited to, spring-loading the tubes, etc.

The compressed form of the device is useful for storing and transporting the device. It may also be useful in the case where the user wishes to place the device on the vehicle from inside the vehicle, as discussed with FIG. 1. The device can be passed through window in its compressed form, then can be converted to its expanded form once outside of window.

Figure 12:
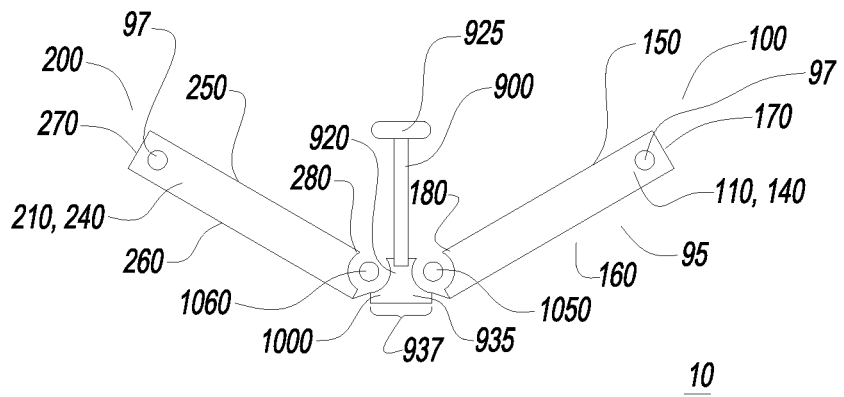
FIG. 12 is a back view of the second embodiment of the invention in a semi-compressed form.
Figure 13:
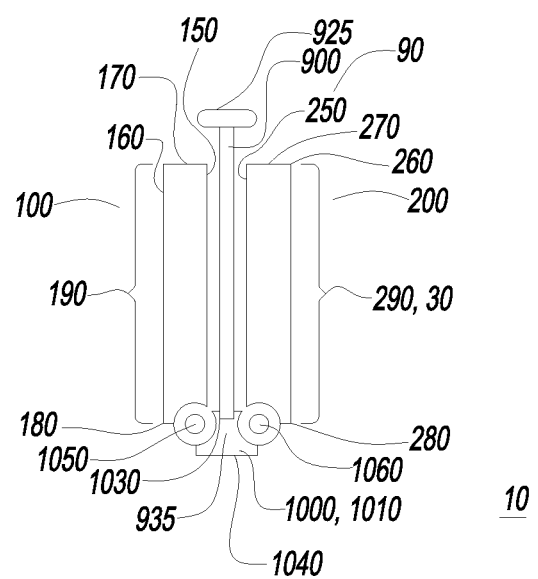
FIG. 13 is a front view of the second embodiment of the invention in a compressed form.

FIGS. 11-13 show the second embodiment of the invention. This embodiment shows the device being compressed through the use of hinges or other rotatable components to fold the arms rather than using a telescoping method. All of the attributes ascribed to the first embodiment are true for this embodiment except for the telescoping of the arms.

FIG. 11 is a front perspective view of the second embodiment of the invention in an expanded form.

FIG. 11 shows the device 10, device extended length 20, device flat surface 40, device rounded surface 50, device impact absorbing structure 60, device bottom 70, device top 80, and device front 90.

Also shown is first arm 100, first arm distal end 170, first arm proximate end 180, second arm 200, second arm distal end 270, second arm proximate end 280, strap 900, strap blocking element 925, strap blocking element interface 927, and strap cavity 935.

Shown in FIG. 11 as well is connecting compartment 1000, connecting compartment front 1010, connecting compartment top 1030, connecting compartment bottom 1040, first hinge 1050, and second hinge 1060.

FIG. 12 is a back view of the second embodiment of the invention in a semi-compressed form.

FIG. 12 shows the device 10, device back 95, magnets 97, first arm 100, first arm flat surface 110, first arm back surface 140, first arm top surface 150, first arm bottom surface 160, first arm distal end 170, first arm proximate end 180, second arm 200, second arm flat surface 210, second arm back surface 240, second arm top surface 250, second arm bottom surface 260, second arm distal end 270, second arm proximate end 280, strap 900, strap interface 920, strap blocking element 925, strap cavity 935, strap cavity length 937, connecting compartment 1000, first hinge 1050, and second hinge 1060.

FIG. 13 is a front view of the second embodiment of the invention in a compressed form.

FIG. 13 shows the device 10, device compressed length 30, device front 90, first arm 100, first arm top surface 150, first arm bottom surface 160, first arm distal end 170, first arm proximate end 180, first arm length 190, second arm 200, second arm top surface 250, second arm bottom surface 260, second arm distal end 270, second arm proximate end 280, and second arm length 290.

Also shown in FIG. 13 are strap 900, strap blocking element 925, strap cavity 935, connecting compartment 1000, connecting compartment front 1010, connecting compartment top 1030, connecting compartment bottom 1040, first hinge 1050, and second hinge 1060.

FIG. 11 shows the device in its extended form, FIG. 12 shows the device semi-compressed, and FIG. 13 shows the device fully compressed. The first arm 100 and the second arm 200 are connected to the connecting compartment 1000 through a first hinge 1050 and a second hinge 1060, respectively. The connecting compartment 1000 contains the strap 900 and strap cavity 935 discussed previously. The first arm 100 and second arm 200 can be pivoted to any desired position via the hinges. The strap can be adjusted as described for the first embodiment.

When the device is extended as shown, the device extended length 20 is between 10 cm and 5 m, with a preferred device extended length of approximately 95 cm, with a first arm preferred length of approximately 45 cm, a second arm preferred length of approximately 45 cm, and a preferable strap cavity length 937 of approximately 5 cm. Although it is preferred for the two arms to be the same length, they may be differing lengths.

The first arm and/or second arm may be solid or hollow. They may be made from a combination of materials, for instance, they may contain a plastic or metal core that is surrounded by a softer plastic covering or a foam covering.

The hinges may be any type of hinge, including but not limited to, barrel hinges pivot hinges, butt/mortise hinges, case hinges, continuous hinges or piano hinges, concealed hinges, flag hinges, strap hinges, H hinges, HL hinges, counterflap hinges, flush hinges, coach hinges, rising butt hinges, double action spring hinges, tee hinges, friction hinges, security hinges, cranked hinges or stormproof hinges, lift-off hinges, ball and socket, living hinge, or self closing hinges.

The preferred type of hinge is a living hinge used in a tripod configuration that has a locking feature.

One or both arms may be extended at the same time, depending on the desired alignment of the device with the vehicle. When compressed, the first arm 100 and second arm 200 may be joined together by a fastener, including but not limited to, a hook and clasp, an encircling fastener similar to a rubber band, etc. The arms may taper along their length or may have any shape that allows the device to achieve its intended purpose.

Although both embodiments are described with the device having two arms, and it is preferred that the device have two arms, the device may have any number of arms and any number of straps.

For both embodiments, the first arm and the second arm may have magnets disposed on their distal ends on the flat surface that contacts the vehicle, as shown in FIGS. 4 and 12. The magnets could be any type, including but not limited to, iron, nickel, cobalt, or rare-earth magnets. The magnets could be any shape, including but not limited to, round, rectangular, or square. The magnets could be disposed anywhere on the first and second arms, or could be on just one arm. There could be one magnet per arm or multiple magnets per arm. There could be magnets on the connecting compartment.

The user would position the device 10 on the vehicle and use the magnets to help secure it to the vehicle.

The device rounded surface 50 shown in FIG. 11 is not circular as it was shown in FIG. 6, but is elliptical in shape. As stated with the description of FIG. 6, the rounded surface may be any shape that presents a rounded or slightly rounded portion at the point farthest from the user's vehicle.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A vehicle outer-body protection device, comprising:
   a) a first arm and a second arm made from impact absorbing structures and having substantially the same size, shape, and structure, and a single strap;
   b) an outer tube and at least one inner tube on each of the first arm and second arm, wherein the inner tube is telescopically attached to the outer tube and can be moved into and out from the outer tube;
   c) a connecting compartment that is equidistant between the first arm and second arm, and which connects the first arm and second arm, comprising a strap cavity and a strap retraction device;
   d) said strap having a first end and a second end, wherein the strap can be retracted to reside in the strap cavity of the connecting compartment and can be extended to an adjusted length, wherein the adjusted length can be controlled by the strap retraction device, the strap being oriented so it is substantially perpendicular to the first arm and second arm when the first arm and second arm are in a sequentially longitudinal alignment; and
   e) a blocking element attached to the second end of the strap.

2. The device as in claim 1, wherein the first arm and second arm have at least two sides extending along the longitudinal length of the arms, wherein one of said sides has a rounded surface and one of said sides has a flat surface, and said flat surface is positioned so as to be in contact with the vehicle.

3. The device as in claim 2, wherein the first arm and the second arm each have a distal end and a proximate end; and said distal ends have magnets disposed on a portion of the flat surface that contacts the vehicle.

4. The device as in claim 1, wherein said outer tube and said inner tube each have a proximate end, a distal end, and a stop, said stop being disposed on said proximate end.

5. The device as in claim 1, in which the first arm and second arm are made of rubber.

6. The device as in claim 1, in which the first arm and second arm are made of plastic.

7. The device as in claim 1, in which the strap is made of rubber.

8. The device as in claim 1, in which the strap is made of fabric.

9. The device as in claim 1, in which the length of the strap is approximately 1.5 meters.

10. The device as in claim 1, where there is a first arm first inner tube, a second arm first inner tube, a first arm second inner tube, a second arm second inner tube, and a first arm outer tube and a second arm outer tube.

11. The device as in claim 10, where the first inner tube is solid and the second inner tube and the outer tube are hollow; the first inner tube has an outer circumference; the second inner tube and the outer tube have an inner circumference and an outer circumference; and the outer circumference of the first inner tube is approximately 1 cm less than the inner circumference of the second inner tube; and the outer circumference of the second inner tube is approximately 1 cm less than the inner circumference of the outer tube.

12. The device as in claim 10, where the second inner tube walls and the outer tube walls have a thickness, and where the thickness of the second inner tube walls and outer tube walls is approximately equal.

13. The device as in claim 10, where the first arm first inner tube and second arm first inner tube with first arm pulling knob and second arm pulling knob are each approximately 17 centimeters in length.

14. The device as in claim 10, where the first arm second inner tube and the second arm second inner tube are each approximately 15 centimeters in length.

15. The device as in claim 10, where the first arm outer tube and second arm outer tube are approximately 15 centimeters in length.

16. A vehicle door protection device, comprising:
a) a first arm and a second arm made from impact absorbing structures and having substantially the same size, shape, and structure; and a single strap
b) a connecting compartment that is equidistant between the first arm and second arm, and which connects the first arm and second arm, comprising
  1) a strap cavity,
  2) a first hinge and a second hinge, the first hinge connected to the first arm and the second hinge connected to the second arm, wherein rotation of the first and second hinges allow the first arm and second arm to switch from a sequentially longitudinal alignment to a side-by-side alignment;
  3) a strap retraction device;
c) said strap having a first end and a second end, wherein the strap can be retracted to reside in the strap cavity of the connecting compartment and can be extended to an adjusted length, wherein the adjusted length can be controlled by the strap retraction device, the strap being oriented so it is substantially perpendicular to the first arm and second arm when the first arm and second arm are in a sequentially longitudinal alignment; and
d) a blocking element attached to the second end of the strap.

17. The device as in claim 16, wherein the first arm and second arm have at least two sides extending along the longitudinal length of the arms, wherein one of said sides has a rounded surface and one of said sides has a flat surface, and said flat surface is positioned so as to be in contact with the vehicle door.

18. The device as in claim 17, wherein the first arm and the second arm each have a distal end and a proximate end; and said distal ends have magnets disposed on a portion of the flat surface that contacts the vehicle door.

19. The device as in claim 16, in which the first arm and second arm are made of rubber.

20. The device as in claim 16, in which the first arm and second arm are made of plastic.

21. The device as in claim 16, in which the strap is made of rubber.

22. The device as in claim 16, in which the strap is made of fabric.

23. The device as in claim 16, in which the length of the strap is approximately 1.5 meters.

24. The device as in claim 16, where the first arm and second arm are each approximately 45 centimeters in length.

* * * * *